United States Patent [19]

EerNisse et al.

[11] Patent Number: 4,802,370
[45] Date of Patent: Feb. 7, 1989

[54] TRANSDUCER AND SENSOR APPARATUS AND METHOD

[75] Inventors: Errol P. EerNisse, Salt Lake City; Roger W. Ward, Park City, both of Utah

[73] Assignee: Halliburton Company, Duncan, Okla.

[21] Appl. No.: 947,022

[22] Filed: Dec. 29, 1986

[51] Int. Cl.⁴ .................... G01F 11/00; G01L 19/04
[52] U.S. Cl. .................... 73/702; 73/708; 310/338; 374/143
[58] Field of Search ............... 73/151, 152, 154, 702, 73/708, 703, 714, 756, 753, 754, 862.59; 310/338; 374/143

[56] References Cited

U.S. PATENT DOCUMENTS

| | | | |
|---|---|---|---|
| 3,355,949 | 12/1967 | Elwood et al. | 73/345 |
| 3,561,832 | 2/1971 | Karrer et al. | 310/9.6 |
| 3,617,780 | 11/1971 | Benjaminson et al. | 310/8.2 |
| 3,683,213 | 8/1972 | Staudte | 310/9.6 |
| 3,826,931 | 7/1974 | Hammond | 310/8.1 |
| 4,020,448 | 4/1977 | Corbett | 340/8 S |
| 4,067,241 | 1/1978 | Corbett | 73/717 |
| 4,079,280 | 3/1978 | Kusters et al. | 310/318 |
| 4,160,183 | 7/1979 | Kusters et al. | 310/315 |
| 4,175,243 | 11/1979 | Corbett | 310/338 |
| 4,178,566 | 12/1979 | Kawashima | 331/156 |
| 4,228,532 | 10/1980 | Sims | 367/159 |
| 4,297,610 | 10/1981 | Ito et al. | 310/370 |
| 4,349,763 | 9/1982 | Hoshi et al. | 310/370 |
| 4,429,248 | 1/1984 | Chuang | 310/370 |
| 4,437,773 | 3/1984 | Dinger et al. | 374/117 |
| 4,439,705 | 3/1984 | Corbett | 310/338 |
| 4,455,875 | 6/1984 | Guimard et al. | 73/708 |
| 4,479,070 | 10/1984 | Frische et al. | 310/338 |
| 4,485,323 | 11/1984 | Corbett | 310/338 |
| 4,498,344 | 2/1985 | Dinger | 73/778 |
| 4,507,970 | 4/1985 | Dinger | 73/702 |
| 4,512,198 | 4/1985 | Sinha et al. | 73/703 |
| 4,535,638 | 8/1985 | EerNisse et al. | 73/862.59 |
| 4,550,610 | 11/1985 | EerNisse | 73/702 |
| 4,562,375 | 12/1985 | Besson et al. | 310/338 |
| 4,592,663 | 6/1986 | EerNisse et al. | 374/117 |
| 4,607,530 | 8/1986 | Chow | 73/708 |
| 4,638,664 | 1/1987 | Tamura | 374/143 |
| 4,659,235 | 4/1987 | Gilmore, Jr. et al. | 374/143 |
| 4,703,650 | 11/1987 | Dosjoub | 374/143 |

Primary Examiner—Donald O. Woodiel
Attorney, Agent, or Firm—Joseph A. Walkowski; E. Harrison Gilbert, III

[57] ABSTRACT

A sensor apparatus includes a pressure sensor, a reference device and a temperature sensor collocated within a common environment. The reference device and the temperature sensor are constructed to have temperature response times matched to the temperature response time of the pressure sensor to compensate for temperature gradients produced either by external heating or by pressure-volume heating.

10 Claims, 3 Drawing Sheets

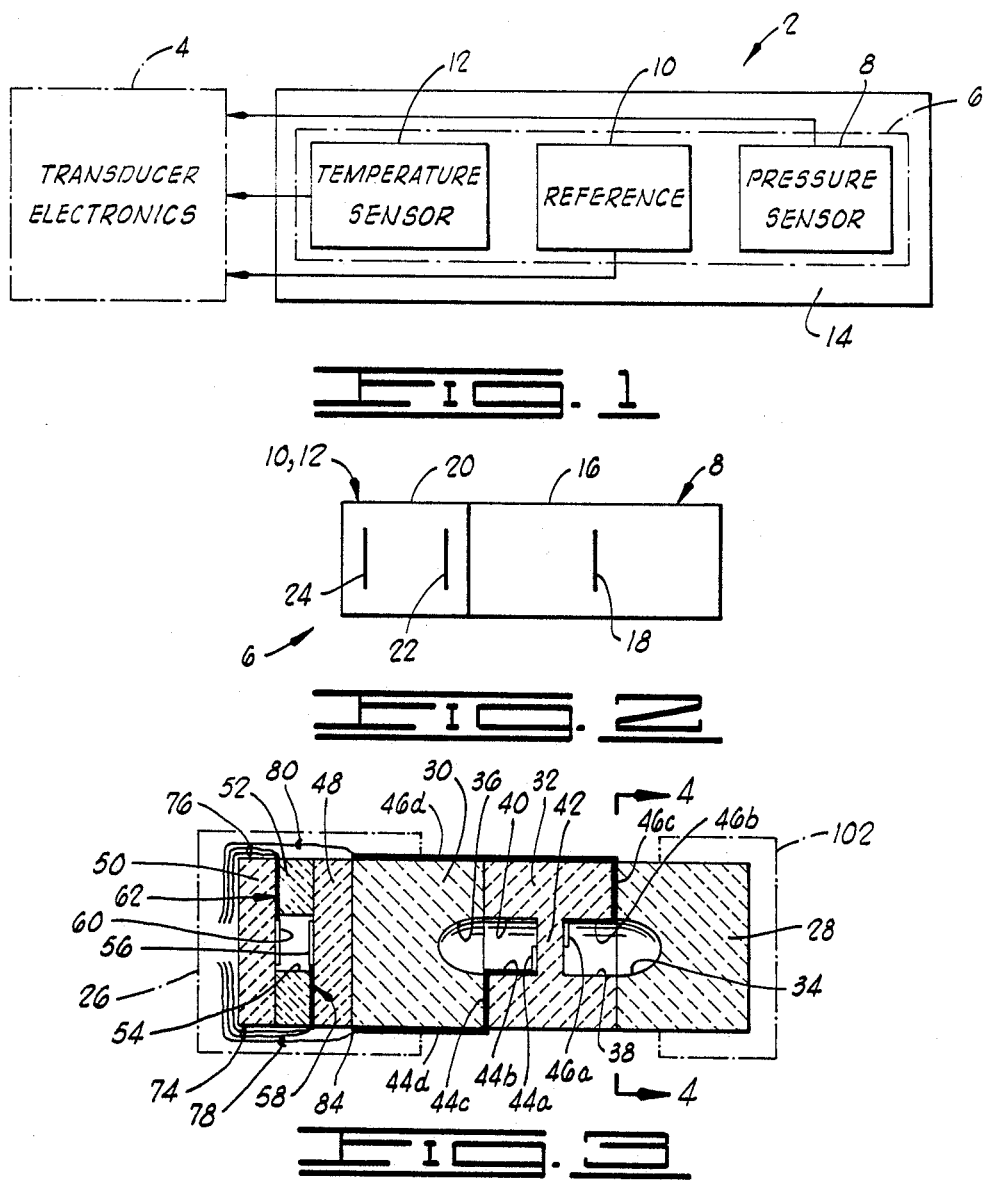
FIG. 1
FIG. 2
FIG. 3
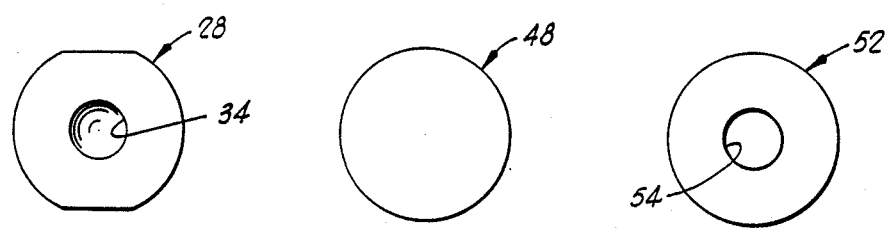
FIG. 4    FIG. 5    FIG. 6

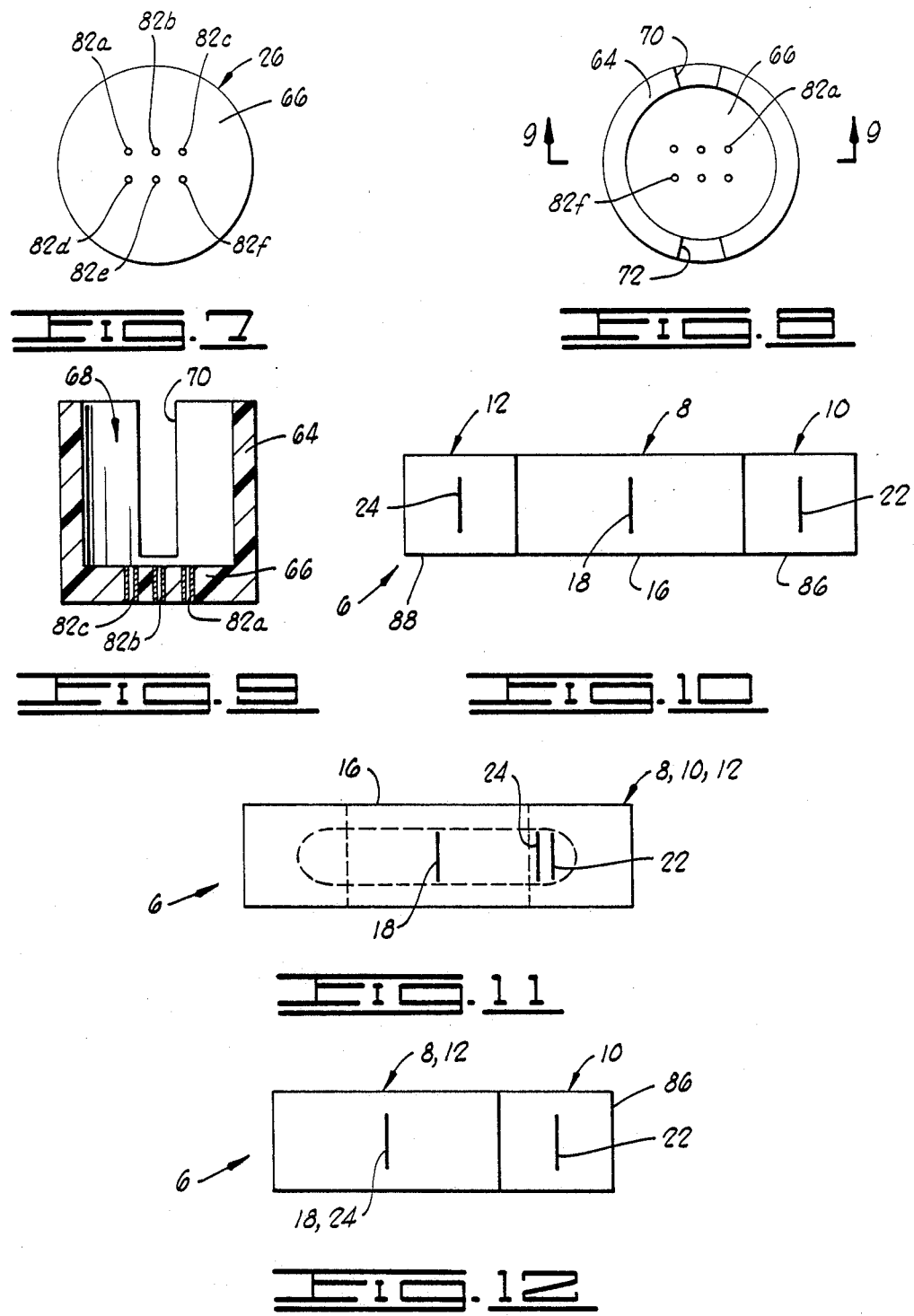

TRANSDUCER AND SENSOR APPARATUS AND METHOD

BACKGROUND OF THE INVENTION

This invention relates generally to apparatus and methods related to sensing a detectable characteristic, such as pressure, and providing signals from which measurements of the characteristic can be derived. More particularly, but not by way of limitation, this invention relates to sensor apparatus, used within a transducer, for sensing pressure and temperature in such a manner that responses altered by temperature changes, whether caused by an external source or by pressure-volume heating, are compensated.

Sensing characteristics is a well-known need in all types of industries and processes. For example, in the oil and gas industry, pressure in a well bore needs to be sensed and measured because pressure is a characteristic used to evaluate the ability of a well to produce. Such measurements are obtained with a transducer having one or more characteristic sensitive devices, referred to herein as sensors, which respond to the desired characteristic or characteristics (e.g., pressure). A transducer also has electronics by which the responsiveness of each sensor is converted into an electrical signal from which the end measurement is ultimately obtained. Sometimes associated with one or more of these sensors is a reference device which provides a reference signal against which the characteristic responsive signals are compared for obtaining a measurement of enhanced accuracy. The use of such a reference device is disclosed in U.S. Pat. No. 3,355,949 to Elwood et al.

A sensor can be sensitive not only to the primary or desired characteristic, but also to some other, ancillary characteristic which coexists with the primary characteristic. For example, a pressure sensor may have a response which is affected not only by pressure, but also by temperature. Such sensitivity or responsiveness to the ancillary characteristic distorts the accuracy with which the primary characteristic can be measured unless the ultimate measurement is compensated for the effect of the ancillary characteristic. For example, if the response of a pressure sensor is also affected by temperature, such a sensor used alone produces a signal, read as a pressure change, when the pressure remains constant, but the temperature changes. Such a distortion also exists even when both a sensor and a reference device are used if both are affected by the ancillary characteristic, but to different extents or at different times.

For purposes of simplicity, the remaining explanation will be given only with specific reference to a pressure sensor which is affected by temperature; however, it is contemplated that this problem can exist between other characteristics.

In the specific example of a pressure sensor which has a pressure response affected by temperature, this general problem has been recognized. In U.S. Pat. No. 4,455,875 to Guimard et al., a reference detector is located in a separate compartment from a pressure sensor, both of which are affected by the ancillary characteristic of temperature. A temperature sensor is located in the same compartment as the reference detector. With these three devices, signals can be obtained and used with known equations to correct, to some degree, for the effect of temperature on the pressure sensor.

The Guimard et al. patent also recognizes a more specific aspect of the general problem. This aspect is that the heat exchange rates of both the pressure sensor and the reference detector should be balanced relative to an external temperature change so that the pressure sensor and the reference detector will respond to the external temperature change at the same time. That is, under static or equilibrium conditions wherein the temperature of the pressure sensor and the temperature of the reference detector are the same, the pressure sensor and the reference detector are presumably affected the same by the same constant temperature existing at both. When an external temperature change occurs, however, the pressure sensor and the reference detector will have their responses affected at different times if the temperature change does not affect both at the same time. To prevent such different, error-producing responses, the Guimard et al. patent proposes to mount the separate reference detector within a heat sink arrangement to try to balance the heat exchange rates of the pressure sensor and the reference detector with the external environment.

Although the Guimard et al. patent recognizes the general problem and this specific aspect relating to temperature changes occurring outside the transducer, it fails to disclose another specific aspect of the general problem as it relates to the specific pressure/temperature example. This other aspect is that temperature gradients can also result within the medium immediately surrounding the pressure sensor which is disposed within a fixed volume of the transducer. As this medium is subjected to pressure changes, temperature changes result. This is referred to as pressure-volume, or PV, heating. U.S. Pat. No. 4,607,530 to Chow recognizes this other specific aspect.

The Chow patent discloses that a temperature sensor is to be located in the same environment as the pressure sensor so that the temperature at the pressure sensor can be obtained. With this information, a dynamic model, based on preliminary data obtained during calibration procedures, is run in a processor to generate temperature-compensated pressure readings.

The Chow patent does not disclose an apparatus wherein both the pressure sensor and the reference detector have a similar temperature time response to thermal transients; therefore, errors can still be produced from the different thermal responses between the pressure sensor and the reference detector unless the Chow modeling makes some attempt to resolve the difference by means of the software, which requires computing time such as in differentiating the temperature response. Differentiation can produce errors by emphasizing normal random temperature errors. Differentiating would require many samples to be taken over a period of time to derive a compensated temperature of the reference. This means that a delay at least equivalent to the temperature time response between the reference detector and the pressure sensor occurs before a corrected measurement can be calculated.

Although these problems related to characteristic sensors being affected by an ancillary characteristic have been recognized, there is still the need for an improved apparatus and method by which measurements of a primary characteristic can be obtained, which measurements are relatively simply compensated, in real time, for ancillary characteristics affecting the response to the primary characteristic. More specifically, there is the need for an improved sensor apparatus having both a pressure sensor and a reference device which compensate in real time for temperature gradients arising from either or both external temperature changes or pressure-volume heating. Such compensation should be simply, but rapidly, obtained to facilitate manufacturing and maintenance and to provide accurate, real time outputs of the desired characteristic.

SUMMARY OF THE INVENTION

The present invention overcomes the above-noted and other shortcomings of the prior art by providing a novel and improved apparatus and method relating to sensors and transducers. As specifically described herein, the invention relates to an apparatus and method incorporating and utilizing a pressure sensor, a reference device, and a temperature sensor; however, it is contemplated that the present invention can have broader application.

In the specific context of a pressure sensor affected by temperature, the invention is based upon the inclusion of temperature sensing and reference devices into the same environmental compartment as the pressure sensing device. In addition, the temperature sensing and reference devices have the same or similar temperature time response as the pressure sensing device. Including a temperature sensing device with similar temperature time response in the same compartment as the pressure sensing device improves response to thermal transients, whether created by an external source or by pressure shocks which result in pressure-volume heating. By also providing a reference device with a similar temperature time response as the temperature and pressure sensing devices, temperature errors may be readily compensated for, in real time, without the need for an additional temperature sensing device next to the reference or involved sampling and differentiating procedures.

In its broader aspects, the apparatus of the present invention is one for providing a signal in response to a detectable characteristic, which apparatus comprises: characteristic sensing means for generating a first signal, which first signal has an identifiable feature correlated to the characteristic by a response of the characteristic sensing means, which response is variable with temperature; reference means for generating a second signal, having an identifiable feature of the same type as the first signal, so that the identifiable feature of the second signal has a substantially constant value defining a reference value against which the identifiable feature of the first signal can be compared, which substantially constant value is dependent upon a response of the reference means, which response of the reference means is variable with temperature and which reference means is collocated with the characteristic sensing means; and temperature sensing means for generating a third signal in response to the temperature where the characteristic sensing means and the reference means are collocated.

With respect to a more specific aspect of the present invention, there is disclosed a transducer comprising: a support body having a chamber which is to be exposed to a pressure to be detected when the transducer is used; pressure sensing means, disposed in the chamber, for sensing the pressure; reference means, disposed in the chamber, for providing a reference relative to which an output of the pressure sensing means is measured; and temperature sensing means, disposed in the chamber, for sensing temperature in the chamber.

The present invention also relates to a method of obtaining signals from which a measurement of a detected pressure can be derived, which measurement is compensated for external temperature gradients and for pressure-volume heating temperature gradients, which method comprises the steps of: (a) placing a pressure sensor in a pressure environment having a pressure to be measured, which environment is subject to external temperature gradients and pres- sure-volume heating temperature gradients, which pressure sensor includes a housing having a predetermined thermal response time to the temperature gradients and which pressure sensor includes a pressure responsive element which generates a pressure indicating signal in response to pressure exerted on the housing, which response is affected by temperature changes communicated thereto at the predetermined thermal response time; (b) concurrently with step (a), placing a reference device in the same pressure environment as the pressure sensor, which reference device includes a housing having a thermal response time matched to the predetermined thermal response time and which reference device includes a reference control element which generates a reference signal based on an inherent response which is affected by temperature changes communicated thereto at the thermal response time of the housing of the reference device; and (c) concurrently with steps (a) and (b), placing a temperature sensor in the same pressure environment as the pressure sensor and the reference device, which temperature sensor includes a housing having a thermal response time matched to the predetermined thermal response time and which temperature sensor includes a temperature responsive element which generates a temperature indicating signal in response to temperature communicated thereto at the thermal response time of the housing of the temperature sensor.

Therefore, from the foregoing, it is a general object of the present invention to provide a novel and improved transducer and sensor apparatus and method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram of a transducer incorporating a sensor apparatus of the present invention as it relates to pressure and temperature.

FIG. 2 s a representation of a particular implementation of the sensor apparatus generally depicted in FIG. 1.

FIG. 3 is a longitudinal sectional view of a specific embodiment of the FIG. 2 representation.

FIG. 4 is an end view of an end piece of a pressure sensor of the FIG. 3 embodiment as viewed along line 4—4 shown in FIG. 3.

FIG. 5 is an end view of an end piece of a reference/temperature sensor assembly of the FIG. 3 embodiment.

FIG. 6 is an end view of a center portion of the reference/temperature sensor assembly of the FIG. 3 embodiment.

FIG. 7 is an end view of a retaining cap of the FIG. 3 embodiment.

FIG. 8 an end view of the retaining cap as viewed opposite the view shown in FIG. 7.

FIG. 9 is a sectional view taken along line 9—9 shown in FIG. 8.

FIG. 10 is a schematic representation of another particular implementation of the sensor apparatus shown in FIG. 1.

FIG. 11 is a schematic representation of still another particular implementation of the sensor apparatus shown in FIG. 1.

FIG. 12 is a schematic representation of a further particular implementation of the sensor apparatus shown in FIG. 1.

DETAILED DESCRIPTION OF THE PREFERRED EMBODIMENTS

Figures 13A, 13B:
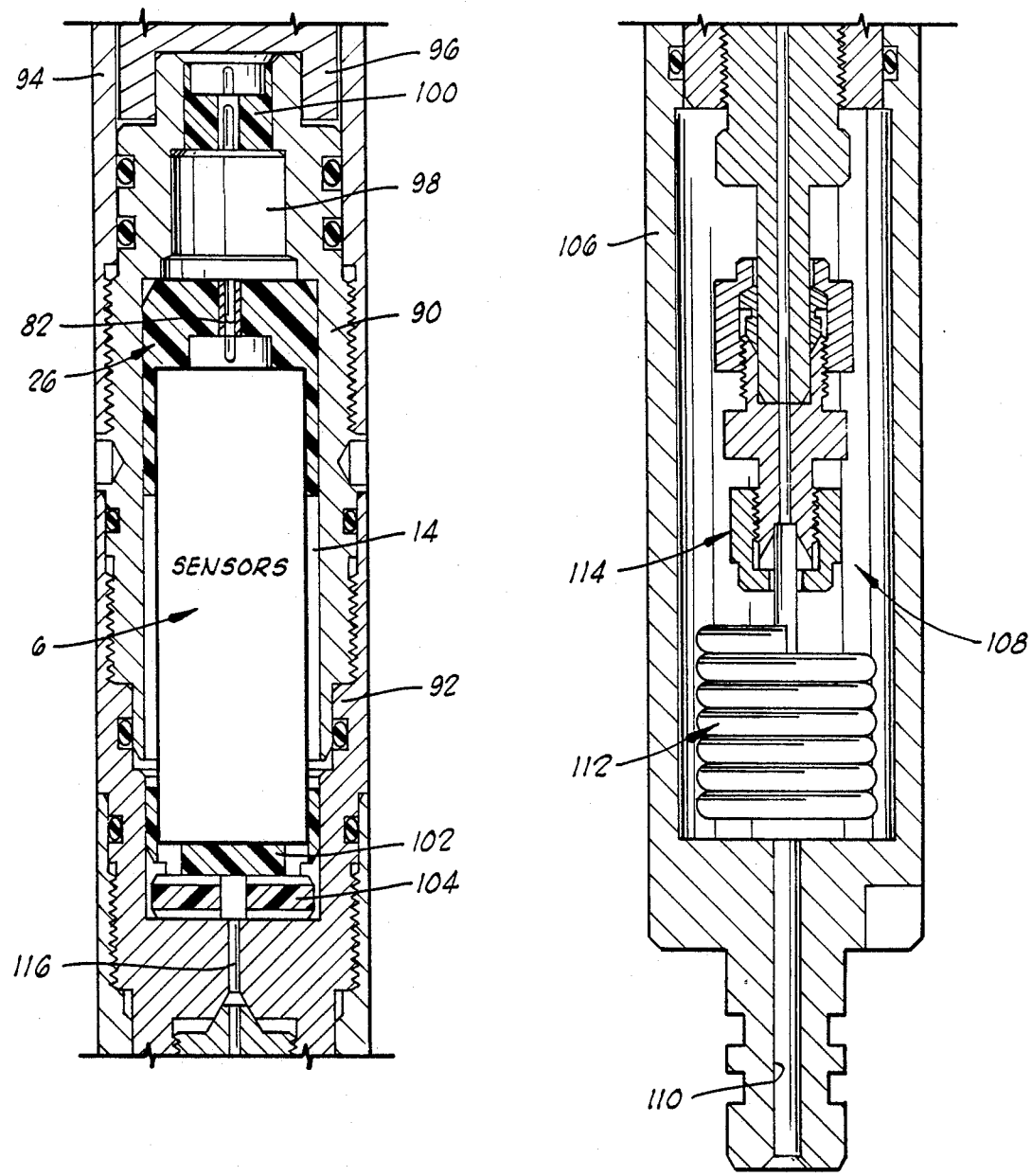
FIGS. 13A-13B form a sectional view of a preferred embodiment of part of a transducer in which the sensor apparatus shown in FIG. 1 is used.

The preferred embodiments of the present invention will be described in the context of pressure being the primary characteristic to be detected and temperature being the ancillary characteristic to which the pressure sensing mechanism is also responsive. For this context, FIG. 1 discloses a transducer 2 capable of sensing pressure and temperature and having utility within any applicable system, such as with a downhole memory recorder used for recording pressure and temperature data in an oil or gas well.

The transducer 2 broadly includes an electronics portion 4 having electrical components and circuits which operate in response to a sensor portion 6, which sensor portion 6 can be broadly referred to as an apparatus for providing one or more signals in response to one or more detectable characteristics. The electronics portion 4 and the sensor portion 6 are mounted within a support body of a suitable type as known to the art. A specific support body for the sensor portion 6 is shown in FIGS. 13A and 13B to be described hereinbelow.

The electronics portion 4 includes well-known features of a transducer. Examples of these are oscillator circuits, mixer circuits and processor circuits (such as a microprocessor providing counting and computing capabilities). These types of circuits are known to the art. With regards to the preferred embodiment of the present invention, a disclosure of the general technique for using the signals received from the sensor portion 6 is made in U.S. Pat. No. 3,355,949 to Elwood et al. The electronics portion 4 is not part of the present invention as claimed and thus will not be further described.

The sensor portion 6 of the preferred embodiment of the present invention includes: characteristic sensing means for generating a signal having an identifiable feature, such as frequency, correlated to the detected characteristic, such as pressure, by a response which is variable with temperature (in the preferred embodiment this is a pressure sensing means 8 for sensing pressure); reference means 10 for generating a signal, having an identifiable feature of the same type as the signal of the characteristic sensing means, so that the identifiable feature of the reference means signal has a substantially constant value defining a reference value against which, or relative to which, the identifiable feature of the characteristic sensing means signal can be compared, which substantially constant value is dependent upon a response of the reference means variable with temperature; and a temperature sensing means 12 for generating a signal in response to the temperature where the characteristic sensing means and the reference means are collocated. The pressure and temperature to be sensed in the preferred embodiment are those existing within a chamber 14 defined in the support body of the transducer 2.

It is an important feature of the inventive sensor portion 6 that all of the pressure sensor 8, the reference device 10 and the temperature sensor 12 are collocated in the same chamber 14. The chamber 14 has a fluid medium in it for conducting to the pressure sensor 8 the pressure to be detected. In the preferred embodiment the fluid is a liquid, such as suitable oil of a type as known to the art. This fluid medium is throughout the chamber 14 so that the sensors 8, 12 and the reference device 10 are collocated within a common fluid medium; however, as subsequently described, the reference device 10 and the temperature sensor 12 are packaged in such a way that they are not sensitive to the pressure communicated by the common fluid medium, but they are sensitive to temperature transients created in or applied to the common fluid medium. This fluid is held within a fixed volume of the support body so that when the pressure within the volume changes, a concomitant temperature change occurs. The temperature of the fluid is also affected by the environmental temperature existing where the transducer 2 is located.

Depicted in the drawings are four particular implementations of the sensor portion 6. The first one to be described, and the one by which the present invention will be most specifically described, is shown in FIGS. 2-9. The other three implementations are schematically represented in FIGS. 10-12, respectively. A specific implementation of a support body for holding the sensor portion 6 will be described with reference to FIGS. 13A and 13B.

In the implementation depicted in FIG. 2, the pressure sensor 8 includes its own housing or packaging 16 in which a pressure sensitive or responsive element 18 is disposed. The reference device 10 and the temperature sensor 12 are combined in a common housing or package 20 in which a reference control or setting element 22 and a temperature sensitive or responsive element 24 are disposed. The common housing 20 of the reference device 10 and the temperature sensor 12 is connected adjacent the pressure sensor 8 by a suitable connector means. One suitable connector means is an end retaining cap 26 shown in phantom in FIG. 3 (to simplify the drawing) and more specifically shown in FIGS. 7-9 to be described subsequently.

The housing or packaging 16 and the pressure sensitive element 18 of the preferred embodiment are constructed the same as the resonator pressure transducer disclosed in U.S. Pat. No. 4,550,610 to EerNisse, except that in the present preferred embodiment two domed end caps are used instead of the flat end pieces shown in the EerNisse patent, which patent is incorporated herein by reference. More particularly, the housing 16 includes a crystalline end piece 28, a crystalline end piece 30 and a crystalline center piece 32. The end pieces 28, 30 have concavities 34, 36, respectively, defining the domed feature of these two pieces. The section 32 is also referred to as a resonator section in that it has the pressure sensitive element 18 integrally formed therein in the form of a crystalline resonator 42. The section 32 has two axial, oppositely facing cavities 38, 40 defined therein on opposite sides of the resonator 42. The cross-sectional shape or configuration of the sensor 8 is apparent from the end view of the end piece 28 shown in FIG. 4; this shape is carried through the pieces 30, 32 as well.

The end piece 28 is connected to one end of the resonator section 32, and the end piece 30 is connected to the other end of the resonator section 32. These connections are made by any suitable means known to the art, such as by glass sealing layers which bond the adjoined pieces when heated sufficiently. When these three sections are connected, the concavity 34 is aligned with the opening 38 and the concavity 36 is aligned with the opening 40. The crystalline structures of the sections 28, 30, 32 are crystallographically aligned or oriented as known to the art. The resultant hollows within the housing 16 are filled with a gas of a type as known to the art or evacuated.

In the preferred embodiment the end pieces 28, 30 and the center piece 32 (including the integral resonator 42) are made of quartz.

Before the end pieces 28, 30 are connected to the center piece 32, suitable plating is done, in a manner as known to the art, along surfaces of the center section 32 to form electrodes extending from opposite faces of the resonator 42 These plated portions are identified by reference numerals 44a, 44b, 44c for one of the electrodes 46a, 46b, 46c for the other electrode. Extending externally of the housing 16 are conductors 44d, 46d, such as flat metallic strips, which define conductive external extensions of the internal electrodes. These electrodes are used to connect the resonator 42 into an oscillator circuit which forms part of the electronics portion 4 in a manner as known to the art. As also known to the art, the resonator 42 has an inherent response which causes, upon electrical excitation, the crystalline structure of the resonator 42 to vibrate at a frequency which changes in response to pressure applied to the outer surface of the center section 32 to which the resonator 42 is connected. Because of the physical nature of the resonator 42, its response is also affected by temperature, which is to be compensated for by the design of the present invention.

The housing 16 of the pressure sensor 8 is designed to have a configuration and size suitable for the particular environment in which the pressure sensor 8 is to be used. For example, the design must be sufficient that the housing 16 can withstand the pressures to be encountered. This design must also be such that the housing 16 holds the resonator 42 in a manner such that the resonator 42 is responsive to the primary detectable characteristic (pressure in the preferred embodiment). From the nature of the embodiment of the sensor 8, the housing 16 also holds the resonator 42 so that it is responsive to temperature. As a result of the particular design for the housing 16, the housing 16 includes means for transferring heat, to which the resonator 42 is responsive, at a predetermined rate. For the design illustrated in FIG. 3, the predetermined heat transfer rate, or thermal or temperature response time, is a function of the material of the housing 16 and the thickness of the wall defined between the longitudinal surfaces defining the peripheries of the openings 38, 40 and the outer surface of the center piece 32; other factors to consider include heat conduction paths along the electrodes 44, 46 and through the end pieces 28, 30 as they may affect the thermal response time to the resonator 42. This function is definable by equations known to the art so that the predetermined rate or time is readily calculable for any given specific design criteria. This predetermined rate is important because it is the basis in the preferred embodiment for designing a specific reference device 10 and a specific temperature sensor 12 because in the present invention the reference device 10 and temperature sensor 12 are to be designed so that they have heat transfer or conductivity characteristics substantially the same as those of the pressure sensor 8 ("substantially the same as" and similar terminology used herein meaning identical or equal to as well as small variations therefrom arising from the realities of designing or manufacturing physical embodiments of these elements).

In the preferred embodiment of the present invention, the thermal matching of the reference device 10 and the temperature sensor 12 relative to the pressure sensor 8 is implemented through the design of the common housing 20 relative to the housing 16. The housings 16, 20 are of primary concern because of their relatively large masses compared to the masses of the sensing elements 18, 24 and the reference element 22. In other embodiments, the designs of these elements may also need to be considered in the thermal matching as would be apparent to those skilled in the art. For the embodiment depicted in FIG. 2, the housing 20 is appropriately constructed when it provides means for transferring heat at a rate similar to the predetermined rate of heat transfer associated with the housing 16. This thermally matches the housing 20 to the housing 16 so that temperature gradients present in the common environment of the sensors 8, 12 and the reference device 10 are conducted at substantially the same rates to the respective internal elements 18, 24, 22.

The common housing 20 is shown in the embodiment of FIG. 3 to particularly include two crystalline end pieces 48, 50 and a crystalline center piece 52 through which a hole 54 is defined and to which the two end pieces 48, 50 are connected by any suitable means known to the art, such as by glass sealing layers forming bonds when heated sufficiently. When completed, the housing 20 has a cavity defined by the hole 54, which cavity is gas-filled or evacuated as appropriate and as known to the art. End views of the end piece 48 and the center piece 52 in FIGS. 5 and 6, respectively, reveal the circular or cylindrical configuration of the reference/temperature sensor assembly or unit. In the preferred embodiment the housing 20 is made of crystalline quartz.

The reference element 22 includes a crystalline quartz resonator 56 connected through a single structural connection to the end piece 48. This connection is by any suitable means known to the art. When the housing 20 is fully assembled, the resonator 56 is disposed in the interior cavity defined by the hole 54.

Two electrodes are connected to the resonator 56. These electrodes are coplanar layers, jointly identified by the reference numeral 58 but electrically separate, disposed between facing surfaces of the end piece 48 and the center piece 52. These electrodes allow the resonator 56 to be connected into a reference oscillator circuit within the transducer electronics section 4 in a manner as known to the art. The resonator 56 is the reference control element which controls or sets the frequency of the reference oscillator circuit in a manner known to the art. With the resonator 56 sealed in the housing 20 and mounted by a single structural connection, the resonator 56 is unaffected by the pressure of the common fluid in which the invention is used; therefore, the frequency of the oscillations provided through the natural or inherent response of the resonator 56 does not change in response to pressure. This response, and thus the frequency, are, however, affected by temperature; but through the aforementioned design of the housing 20, wherein it is thermally matched with the housing 16, this effect is compensated for, automatically and in real time, because the effects of temperature on the resonator 42 and the resonator 56 will occur at substantially the same time.

The temperature responsive element 24 is connected through a single structural connection to the end piece 50. In the preferred embodiment the temperature responsive element 24 is a crystalline quartz torsional tuning fork resonator 60, such as of the type described in U.S. Pat. No. 4,592,663 to EerNisse et al., incorporated herein by reference. When the housing 20 is assembled, the resonator 60 is disposed in the cavity defined by the hole 54. Two electrodes disposed between the facing surfaces of the pieces 50, 52 extend from the resonator 60 as indicated in FIG. 3 by the reference numeral 62. These electrodes are used to connect the resonator 60 to an oscillator of the transducer electronics section 4 in a manner as known to the art. The inherent response of the resonator 60 is affected by temperature; therefore, the resonator 60 creates oscillations at a frequency which is correlated to the temperature conducted to the resonator 60 through the housing 20. The housing 20, however, is sealed and the resonator 60 is mounted so that the resonator 60 is not affected by the pressure outside the housing 20.

For the housing 20 represented in FIG. 3, important design features for achieving the thermal matching requisite to the present invention are the materials of which the end and center pieces 48, 50, 52 and of which the electrodes 58, 62 are made because it is through these components that the heat conduction paths to the resonators 56, 60 are defined. For example, heat conducts through the wall between the longitudinal surface defining the hole 54 and the outer surface and moves rapidly along the metal electrodes 58, 62 to the resonators 56, 60. Some heat can also come through the end pieces 48, 50 so that their design also must be considered to obtain a proper complete thermal response design relative to the pressure sensor 8. The specific dimensions are obtainable in a given case using equations known to the art.

To recapitulate, the housing 20 is constructed so that the elements 22, 24 are shielded or protected from the primary characteristic, which is pressure in the illustrated embodiment; however, the housing 20 allows the elements 22, 24 to be exposed to the ancillary characteristic, which is temperature in the illustrated embodiment. The housing 20 is designed so that the responsiveness of the reference and temperature responsive elements 22, 24 is matched to the temperature responsiveness of the pressure responsive element 18. The design of the housing 20 by which this matching is obtained in the preferred embodiment is obtained by using equations known to the art based upon the predetermined design of the pressure sensor 8 and the material of construction of the reference device 10 and the temperature sensor 12. In the illustrated embodiment, the material of construction for the reference device 10 and the temperature sensor 12 is quartz (i.e., the housing 20 and the elements 22, 24 are quartz). In this embodiment, the principal aspects to be designed or considered are the thickness of the wall disposed radially outwardly from the resonators 56, 60, the thickness of the end pieces 48, 50, and the heat conductive paths of the electrodes 58, 62. Thus, the housing 16 provides means for communicating a temperature change into the pressure sensor 8 so that the response of the pressure sensor 8 changes as a result thereof at a known or computable time, and the housing 20 is constructed to provide means for communicating a temperature change into the reference device 10 and the temperature sensor 12 so that their responses change as a result of the temperature change at a time substantially the same as the known or computable time.

The fully assembled reference/temperature sensor unit packaged within the common housing 20 is held adjacent an end surface of the housing 16 by means of the end cap 26. For the embodiment of the sensor section 6 shown in FIG. 3, the end cap 26 has a particular construction as illustrated in FIGS. 7-9. The end cap 26 is cylindrical and made of TEFLON ®. The end cap 26 has a cylindrical peripheral wall 64 extending from a circular end wall 66 so that a cavity 68 is defined within the end cap 26. The peripheral wall 64 has two slots 70, 72 defined longitudinally along diametrically opposite portions of it.

The slots 70, 72 accommodate the flat conductive strips 44d, 46d forming respective parts of the two electrodes 44, 46 of the pressure sensor 8. The slots 70, 72 are defined deep enough toward the end wall 66 to accommbdate also wires connected to the electrodes 58, 62 of the reference device 10 and the temperature sensor 12, respectively. As shown in FIG. 3, two wires 74 are connected to the electrodes 58 and two wires 76 are connected to the electrodes 62. A wire 78 is connected to the electrode portion 44d of the pressure sensor 8, and a wire 80 is connected to the portion 46d of the other electrode of the pressure sensor 8. These wires extend along the outside of the reference/temperature sensor unit within the slots 70, 72 and into a region between the inner surface of the end wall 66 of the cap 26 and the facing surface of the reference/temperature sensor unit as is discernible from FIG. 3.

Each end of the wires 74, 76, 78, 80 not connected to an electrode of a resonator is connected to a respective one of six electrical terminals 82a, 82b, 82c, 82d, 82e, 82f which are disposed longitudinally through the end wall 66 (FIGS. 7-9). The terminals 82 are hollow metallic cylinders defining both electrical contacts and mechanical connectors (specifically, sockets) by which the sensor section 6 is plugged to mating prongs connected to the transducer electronics section 4 (see FIGS. 13A-13B subsequently described).

When the sensor section 6 having the embodiment shown in FIGS. 3-9 is fully assembled, the reference unit 10/temperature sensor 12 combination is disposed in the cavity 68 of the cap 26 adjacent the inner surface of the end wall 66. One end of the housing 16 of the pressure sensor 8 is received in the remaining open end portion of the cavity 68 so that the end cap 26 holds the reference/temperature sensor unit next to the pressure sensor 8. The peripheral wall 64 does not extend over the outer surface of the center section 32 of the pressure sensor 8 so that the wall 64 does not apply to the section 32 any force which might cause a misreading of the pressure exerted on the section by the surrounding fluid medium. This connecting or coupling of the reference/temperature sensor does not necessarily result in a surface of the housing 20 directly touching the adjacent surface of the housing 16 because, in the preferred embodiment, the fluid within the chamber 14 is not sealed from entering the cavity 68 of the cap 26 so that the fluid is allowed to form a layer extending across and between the facing end surfaces of the two housings to provide a shock-absorbing cushion therebetween. This cushion would be formed at the interface identified in FIG. 3 by the reference numeral 84.

The other three embodiments of the sensor section 6 illustrated in FIGS. 10-12 are constructed in accordance with the general design criteria referred to hereinabove. That is, the pressure sensor 8, the reference device 10 and the temperature sensor 12 components are all constructed to have matched temperature time responses. These three components are also assembled for use within the same specific environment so that each is exposed to the same temperature gradients, whether created externally or by pressure-volume heating. The reference device 10 and the temperature sensor 12 are, however, constructed so that they are not affected by the pressure to which the pressure sensor 8 is responsive. sive.

In the FIG. 10 embodiment, each of the pressure sensor 8, the reference device 10, and the temperature sensor 12 is constructed with its own, individual housing. The pressure sensor 8 has its housing 16 in which its pressure sensing element 18 is mounted; however, the reference control element 22 is disposed within its own housing 86, and the temperature sensitive element 24 is contained in its own housing 88. In the preferred embodiment these are quartz devices constructed in any suitable manner as known to the art, but consistent with the herein stated concepts of the present invention.

In the FIG. 11 embodiment, the pressure sensor 8 has its housing 16 and its pressure sensitive element 18 constructed as shown in FIG. 3. In this embodiment, however, neither the reference device 10 nor the temperature sensor 12 has its own housing. Rather, the reference device 10 has its reference control element 22 mounted in one of the concavities of one of the domed end caps of the housing 16. Similarly, the temperature sensor 12 has its temperature sensitive element 24 mounted in one of the concavities of one of the domed end caps (shown as the same in FIG. 11, but not necessarily so).

In the FIG. 12 embodiment, the pressure sensor 8 and the temperature sensor 12 are both provided by the identical physical structure. This could be a construction similar to that shown in FIG. 3 for the pressure sensor 8, except that the resonator 42 would be of a type capable of dual mode operation. That is, such resonator would simultaneously respond to pressure and temperature and simultaneously provide different oscillations detectable by respective oscillator circuits. Such dual mode operation of a crystal is known, such as recognized in U.S. Pat. No. 4,562,375 to Besson et al. Associated with this single structure defining both the pressure sensor 8 and the temperature sensor 12 is the reference device 10 having its reference control element 22 housed in its own housing, such as the housing 86 identified in FIG. 10.

Referring next to FIGS. 13A and 13B, an example of a support body for the sensor portion 6 will be described. The support body includes a cylindrical upper housing 90 and a cylindrical lower housing 92 threadedly connected together and suitably sealed as illustrated in FIG. 13A. The upper housing 90 is threadedly connected to a sleeve 94 forming another portion of the support body and extending upwardly from the upper housing 90 to the remainder of the transducer 2 in which the transducer electronics section 4 is housed.

The electronics section 4 is connected to the sensor section 6, mounted within the chamber 14 defined by interior surfaces of the housings 90, 92, through an adapter 96 having a box end into which a pin end of the upper housing 90 extends as shown in FIG. 13A. The electrical connections with the transducer electronics section 4 are made through a pin plug 98 and a connector top 100. The pin plug 98 has prongs which extend into the sockets 82 of the end cap 26, one of which sockets is illustrated in FIG. 13A.

The end of the sensor section 6 opposite the end cap 26 has an end cap 102 which, with a buffer element 104, supports the lower end of the sensor section 6 within the chamber 14 when the transducer 2 is in its upright position.

Connected to the lower end of the lower housing 92 is a buffer tube housing 106 having a cavity 108 communicating with the outside through a passageway 110. A buffer tube 112 of a type as known to the art is disposed in the cavity 108. The buffer tube 112 communicates pressure from the cavity 108 through a reducing union assembly 114 threadedly connected to the lower housing 92 in communication with a bore 116 extending axially therethrough into communication with the chamber 14. The pressure communicating circuit extending through the buffer tube 112, the passageway of the reducing union assembly 114, the bore 116, and the chamber 14 has a fluid in it. This fluid is subject to the aforementioned pressure-volume heating. It is also subject to the temperature existing externally of the transducer 2 as communicated thereto through the side walls of the upper and lower housings 90, 92 or otherwise. Through the structure and methodology of the present invention, both types of temperature changes or heating are compensated for in the present invention.

With respect to the exemplary environment wherein pressure is to be detected, the methodology of the present invention provides for obtaining signals from which a measurement of the detected pressure can be derived, which measurement is compensated for external temperature gradients or for pressure-volume heating temperature gradients. The method comprises (a) placing a pressure sensor in a pressure environment whose pressure is to be measured, which environment is subject to external temperature gradients and pressure-volume heating temperature gradients. The pressure sensor of the preferred embodiment is the pressure sensor 8 which includes the housing 16 having a predetermined thermal response time to the temperature gradients; the pressure sensor 8 also includes the pressure responsive element 18 which generates a pressure indicating signal in response to pressure exerted on the housing 16, which response is affected by temperature changes communicated thereto at the predetermined thermal response time.

The method further comprises a step (b), performed concurrently with step (a), of placing a reference device in the same pressure environment as the pressure sensor. In the preferred embodiment the reference device is the device 10 which includes a housing (either a common one, e.g., housing 20, or an individual one, e.g., housing 86) having a thermal response time matched to the predetermined thermal response time. The reference device also has the reference control element 22, which generates a reference signal based on an inherent response which is affected by temperature changes communicated to the element 22 at the thermal response time of the housing of the reference device which is matched with that of the pressure sensor. This matching compensates, as between the pressure sensor and the reference device, for the changed responses resulting from temperature changes.

The method still further includes a step (c), performed concurrently with steps (a) and (b), of placing a temperature sensor in the same pressure environment as the pressure sensor and the reference device. In the preferred embodiment the temperature sensor is the sensor 12 which includes a housing (either a common one, e.g., the housing 20, or its own, e.g., the housing 88) having a thermal response time matched to the predetermined thermal response time of the pressure sensor. The temperature sensor also includes the temperature responsive element 24 which generates a temperature indicating signal in response to the temperature communicated thereto at the thermal response time of the housing of the temperature sensor.

All of the signals from the sensors 8, 12 and the reference 10 are used in the respective oscillator circuits to produce electrical signals having frequencies respectively indicative of the sensed pressure and temperature and of the reference frequency. These electrical signals are used in manners as known to the art (see, for example, U.S. Pat. No. 3,355,949 to Elwood et al.) to produce pressure and temperature readouts. Through the implementation of equations known to the art, these signals are used to compensate for temperature effects on the pressure measurement.

Thus, the present invention is well adapted to carry out the objects and attain the ends and advantages mentioned above as well as those inherent therein. While preferred embodiments of the invention have been described for the purpose of this disclosure, changes in the construction and arrangement of parts can be made by those skilled in the art, which changes are encompassed within the spirit of this invention as defined by the appended claims.

What is claimed is:

1. An apparatus for providing a signal in response to a detectable characteristic, said apparatus comprising:
    characteristic sensing means for generating a first signal, said first signal having an identifiable feature correlated to the characteristic by a response of said characteristic sensing means, which response is variable with temperature;
    reference means for generating a second signal, having an identifiable feature of the same type as said first signal, so that the identifiable feature of said second signal has a substantially constant value defining a reference value against which the identifiable feature of said first signal can be compared, said substantially constant value dependent upon a response of said reference means, which response of said reference means is variable with temperature, said reference means collocated with said characteristic sensing means;
    temperature sensing means for generating a third signal in response to the temperature where said characteristic sensing means and said reference means are collocated; and wherein:
    said characteristic sensing means includes means for transferring heat at a predetermined rate; and
    said reference means includes means for transferring heat at a rate equal to said predetermined rate.

2. An apparatus for providing a signal in response to a detectable characteristic, said apparatus comprising:
    characteristic sensing means for generating a first signal, said first signal having an identifiable feature correlated to the characteristic by a response of said characteristic sensing means, which response is variable with temperature;
    reference means for generating a second signal, having an identifiable feature of the same type as said first signal, so that the identifiable feature of said second signal has a substantially constant value defining a reference value against which the identifiable feature of said first signal can be compared, said substantially constant value dependent upon a response of said reference means, which response of said reference means is variable with temperature, said reference means collocated with said characteristic sensing means;
    temperature sensing means for generating a third signal in response to the temperature where said characteristic sensing means and said reference means are collocated; and
    wherein said characteristic sensing means and said temperature sensing means are defined at least in part by a common resonator adapted for dual mode operation.

3. An apparatus for providing a signal in response to a detectable characteristic, said apparatus comprising:
    characteristic sensing means for generating a first signal, said first signal having an identifiable feature correlated to the characteristic by a response of said characteristic sensing means, which response is variable with temperature, said characteristic sensing means including:
        a first resonator; and
        first housing means for holding said first resonator so that said first resonator is responsive to the detectable characteristic and to temperature;
    reference means for generating a second signal, having an identifiable feature of the same type as said first signal, so that the identifiable feature of said second signal has a substantially constant value defining a reference value against which the identifiable feature of said first signal can be compared, said substantially constant value dependent upon a response of said reference means, which response of said reference means is variable with temperature, said reference means collocated with said characteristic sensing means, said reference means including:
        a second resonator; and
        second housing means for holding said second resonator so that said second resonator is responsive to temperature but not to the detectable characteristic;
    temperature sensing means for generating a third signal in response to the temperature where said characteristic sensing means and said reference means are collocated; and
    wherein said first housing means and said second housing means are thermally matched so that temperature changes are conducted therethrough to said first resonator and said second resonator, respectively, at substantially the same rate.

4. An apparatus for providing a signal in response to a detectable characteristic, said apparatus comprising:
    characteristic sensing means for generating a first signal said first signal having an identifiable feature correlated to the characteristic by a response of said characteristic sensing means, which response is variable with temperature;
    reference means for generating a second signal, having an identifiable feature of the same type as said first signal, so that the identifiable feature of said second signal has a substantially constant value defining a reference value against which the identifiable feature of said first signal can be compared, said substantially constant value dependent upon a response of said reference means, which response of said reference means is variable with temperature, said reference means collocated with said characteristic sensing means;

temperature sensing means for generating a third signal in response to the temperature where said characteristic sensing mens and said reference means are collocated; and wherein:

said characteristic sensing means and said reference means are collocated in an environment in which a temperature change occurs in response to a pressure change therein;

said characteristic sensing means includes means for communicating said temperature change into said characteristic sensing means so that the response of said characteristic sensing means changes as a result thereof at a first time; and said reference means includes means for communicating said temperature change into said reference means so that the response of said reference means changes as a result thereof at a time substantially the same as said first time.

5. A transducer, comprising:

a support body having a chamber which is to be exposed to a pressure to be detected when said transducer is used;

pressure sensing means, disposed in said chamber, for sensing the pressure;

reference means, disposed in said chamber, for providing a reference relative to which an output of said pressure sensing means is measured;

temperature sensing means, disposed in said chamber, for sensing temperature in said chamber; and an end cap having an end wall and having a peripheral wall extending from said end wall so that a cavity is defined, said reference means and said temperature sensing means disposed in said cavity and an end of said pressure sensing means received in said cavity so that said end cap holds said reference means and said temperature sensing means next to said pressure sensing means.

6. A transducer as defined in claim 5, wherein:

said end cap further includes six electrical terminals disposed in said end wall;

said pressure sensing means includes two electrodes connected to two of said electrical terminals;

said reference means includes two electrodes connected to another two of said electrical terminals; and said temperature sensing means includes two electrodes connected to still another two of said electrical terminals.

7. A transducer, comprising:

a support body having a chamber which is to be exposed to a pressure to be detected when said transducer is used;

pressure sensing means, disposed in said chamber, for sensing the pressure;

reference means, disposed in said chamber, for providing a reference relative to which an output of said pressure sensing means is measured;

temperature sensing means, disposed in said chamber, for sensing temperature in said chamber; and wherein:

said reference means and said temperature sensing means share a common housing having an interior cavity shielded from the pressure to which said chamber is to be exposed when said transducer is used, said housing including a crystalline first end piece, a crystalline second end piece, and a crystalline center piece through which a hole is defined and to which said first end piece and said second end piece are connected;

said reference means includes a reference control element disposed in said interior cavity so that said reference control element is shielded from the pressure to which said chamber is to be exposed when said transducer is used, said reference control element including a crystalline resonator connected through a single structural connection to said first end piece; and said temperature sensing means includes a temperature responsive element disposed in said interior cavity so that said temperature responsive element is shielded from the pressure to which said chamber is to be exposed when said transducer is used, said temperature responsive element including a crystalline torsional tuning fork resonator connected through a single structural connection to said second end piece.

8. A transducer, comprising:

a support body having a chamber which is to be exposed to a pressure to be detected when said transducer is used;

pressure sensing means, disposed in said chamber, for sensing the pressure, said pressure sensing means including:
a crystalline resonator section;
a crystalline first end piece having a concavity defined therein, said first end piece connected to one end of said resonator seciton; and
a crystalline second end piece having a concavity defined therein, said second end piece connected to the other end of said resonator section;

reference means, disposed in said chamber, for providing a reference relative to which an output of said pressure sensing means is measured, said reference means including a crystalline resonator mounted in one of the concavities; and temperature sensing means, disposed in said chamber, for sensing temperature in said chamber, said temperature sensing means including a crystalline resonator mounted in one of the concavities.

9. A transducer, comprising:

a support body having a chamber which is to be exposed to a pressure to be detected when said transducer is used;

pressure sensing means, disposed in said chamber, for sensing the pressure;

reference means, disposed in said chamber, for provding a reference relative to which an output of said pressure sensing means is measured;

temperature sensing means, disposed in said chamber, for sensing temperature in said chamber; and wherein:

said pressure sensing means includes a housing having an end surface;

said reference means includes a housing having an end surface;

said support body has a fluid in said chamber; and
said housing of said pressure sensing means and said housing of said reference means are disposed in said chamber so that a layer of said fluid extends across and between the end surfaces of said housings of said pressure sensing means and said reference means, said layer of fluid providing a shock-absorbing cushion between said housings.

10. A method of obtaining signals from which a measurement of a detected pressure can be derived, which measurement is compensated for external temperature gradients and for pressure-volume heating temperature gradients, said method comprising the steps of:

(a) placing a pressure sensor in a pressure environment having a pressure to be measured, which environment is subject to external temperature gradients and pressure-volume heating temperature gradients, said pressure sensor including a housing having a predetermined thermal response time to the temperature gradients and said pressure sensor including a pressure responsive element which generates a pressure indicating signal in response to pressure exerted on said housing, which response is affected by temperature changes communicated thereto at said predetermined thermal response time;

(b) concurrently with step (a), placing a reference device in the same pressure environment as said pressure sensor, said reference device including a housing having a thermal response time matched to said predetermined thermal response time and said reference device including a reference control element which generates a reference signal based on an inherent response which is affected by temperature changes communicated thereto at said thermal response time of said housing of said reference device; and (c) concurrently with steps (a) and (b), placing a temperature sensor in the same pressure environment as said pressure sensor and said reference device, said temperature sensor including a housing having a thermal response time matched to said predetermined thermal response time and said temperature sensor including a temperature responsive element which generates a temperature indicating signal in response to temperature communicated thereto at said thermal response time of said housing of said temperature sensor.

* * * * *